The present invention relates to crack detector, and more particularly to a magnetic crack detector for detecting cracks in ferrous or other magnetic materials.

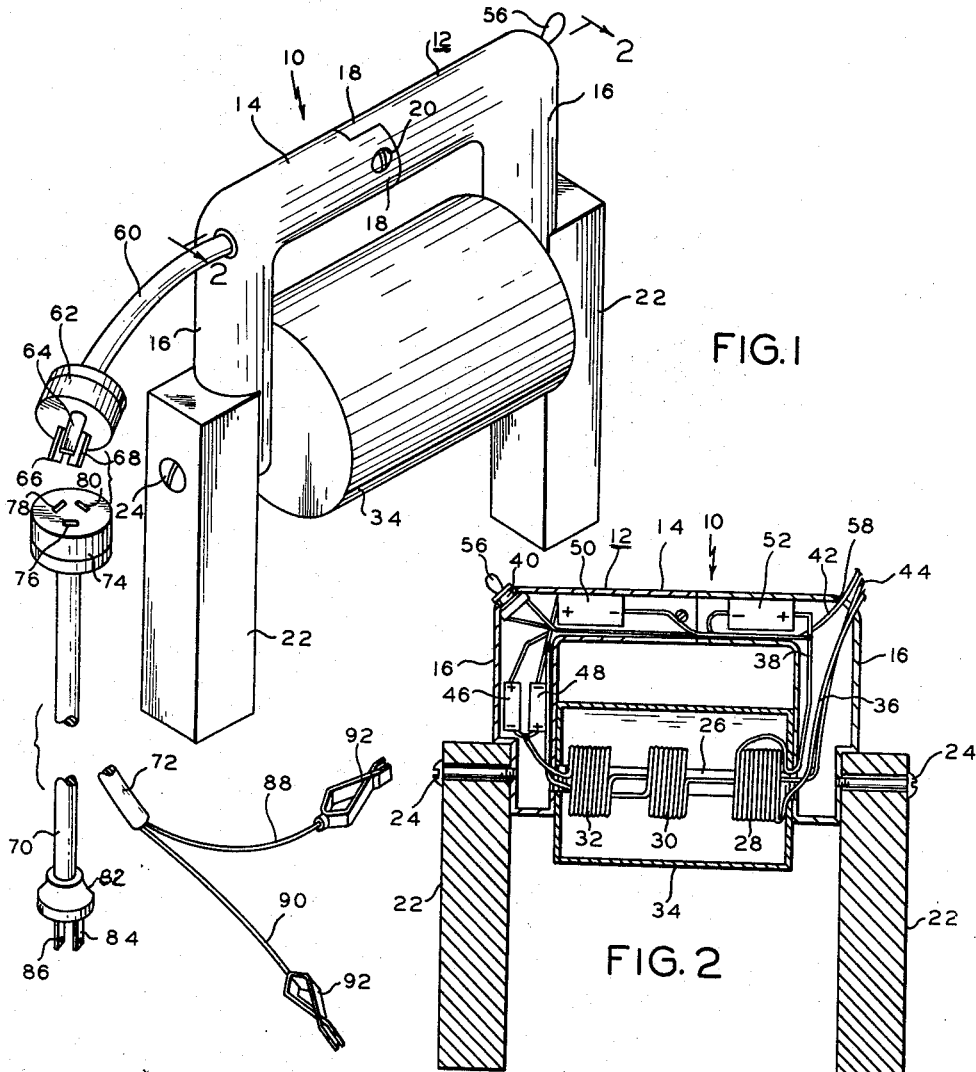
Aug. 25, 1964　　　D. DIPERSTEIN ETAL　　　3,146,396
PORTABLE MAGNETIC PARTICLE TYPE CRACK DETECTOR
HAVING SEPARATE COILS FOR ALTERNATING
AND DIRECT CURRENT
Filed Jan. 15, 1960
INVENTORS
DAVID DIPERSTEIN
RUSSELL J. HARDIMAN
BY
Arthur H. Seidel
ATTORNEY 3,146,396
PORTABLE MAGNETIC PARTICLE TYPE CRACK DETECTOR HAVING SEPARATE COILS FOR ALTERNATING AND DIRECT CURRENT
David Diperstein, 2500 E. York St., Philadelphia 25, Pa., and Russell John Hardiman, Philadelphia, Pa.; said Hardiman assignor to said Diperstein
Filed Jan. 15, 1960, Ser. No. 2,624
4 Claims. (Cl. 324—38)

An excellent method for detecting cracks in cast iron or other magnetic material parts is to produce a magnetic path along the surface of the part, and spinkle iron filings over the surface. If there is a crack in the part, the edges of the crack will act as the opposite poles of a magnet. The iron filings will then align themselves along the flux paths of the two magnetic poles, and thereby completely outline the crack. Although this method is relatively fast and detects even the smallest crack, it has not been extensively used because of the complexity and cost of the equipment which has heretofore been available to carry out the process.

It is an object of the present invention to provide a novel crack detector.

It is another object of the present invention to provide a novel crack detector which is portable, operative on D.C. current, and which may be used for detecting both subsurface and surface defects.

It is another object of the present invention to provide a novel magnetic crack detector for detecting cracks in magnetic materials.

It is still another object of the present invention to provide a magnetic crack detector which can be operated either on A.C. or D.C. current.

It is a further object of the present invention to provide a magnetic crack detector which is small and compact so that it can be carried by hand and which is relatively inexpensive.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a perspective view of the crack detector of the present invention.

FIGURE 2 is a sectional view taken along line 2—2 of FIGURE 1.

FIGURE 3 is a circuit diagram of the electrical circuit of the crack detector of the present invention.

Referring initially to FIGURES 1 and 2, the crack detector of the present invention is generally designated as 10.

Crack detector 10 comprises a hollow, U-shaped handle 12. Handle 12 has a bight 14, and a pair of parallel legs 16 extending from the ends of the bight 14. For ease of assembling the crack detector 10, the handle 12 is divided across the bight 14 into two sections. The mating ends 18 of the bight 14 overlap each other, and are secured together by a bolt 20. A separate probe 22 of a magnetic material is secured to the end of each of the legs 16 of the handle 12 by a bolt 24. The probes 22 extend longitudinally from the ends of the legs 16, and are parallel to each other.

An iron rod 26 extends between and is secured to the ends of the legs 16 of the handle 12. The rod 26 is parallel to, but spaced from the bight 14 of the handle 12. Three separate inductance windings 28, 30, and 32 are wound around portions of the rod 26 which provides the core for the windings 28, 30 and 32. As shown in FIGURE 3, the windings 28 and 30 produce the magnetic field for the crack detector 10, and the winding 32 is a choke. A cylindrical casing 34 is mounted around the core rod 26 and the windings 28, 30, and 32. The casing 34 is of a diameter large enough to cover the windings 28, 30 and 32, but small enough to leave an opening between the casing 34 and the bight 14 of the handle 12.

The inductance coil 28 provides the magnetic path for the crack detector 10 when the crack detector 10 is operating on D.C. current, and the inductance coil 30 provides the magnetic path when the crack detector 10 is operating on A.C. current. The D.C. inductance coil 28 may comprise, for example, four hundred turns of #20 wire, and the A.C. inductance coil 30 may comprise, for example, seven thousand turns of #30 wire. As shown in FIGURE 3, one side of the inductance coil 28 is connected to a terminal wire 36. The other side of the inductance coil 28 is connected by a wire 38 to one side of a switch 40. The other side of the switch 40 is connected to a terminal wire 42.

The A.C. inductance oil 30 is connected to be energized by the application of A.C. power between switch 40 and a terminal wire 44. Thus, the terminal wire 42 is a common terminal wire for both the inductance windings 28 and 30. The choke 32, which for example may comprise two hundred turns of #30 wire, is connected between the terminal wire 44 and the inductance coil 30 to impede stray high frequencies and switching transients. The circuit between the terminals 42 and 44 and the inductance coil 30 includes means for increasing the voltage across the inductance 30. As shown, a voltage doubler circuit is included in the circuit between the terminal wires 42 and 44 and the inductance coil 30. Thus, the terminal wires 42 and 44 can be connected across a standard 115 volt 60 cycle current source, and 220 volts will be provided across the inductance coil 30. The voltage doubler circuit is a standard type full-wave voltage doubler which includes the rectifiers 46 and 48, and the capacitors 50 and 52, which may be each, for example, of a value of eighty microfarads. A wire 54 connects the switch 40 to the voltage doubler circuit at the common wire between the capacitors 50 and 52.

As shown in FIGURE 2, the entire circuit for the crack detector 10 of the present invention, except for the inductance coils 28, 30, and 32, is within the hollow handle 12. The capacitors 50 and 52 are within the bight 14 of the handle 12, and the rectifiers 46 and 48 are within one of the legs 16 of the handle. The switch 40 is mounted in one corner of the handle 12 with the actuating button 56 of the switch 40 projecting from the handle 12. The terminal wires 36, 42, and 44 extend through a hole 58 in the other corner of the handle 12. As shown in FIGURE 1, the terminal wires 36, 42, and 44 project from the handle 12 as the cable 60. A plug 62 is secured to the end of the cable 60. The plug 62 has three terminals 64, 66, and 68 to which the terminal wires 36, 42, and 44 are connected respectively.

The crack detector 10 is provided with two separate connecting cables 70 and 72. Each of the cables 70 and 72 has a socket 74 secured to one end thereof. The socket 74 has three female contacts 76, 78, and 80 which are adapted to receive the terminals 64, 66, and 68 respectively of the plug 62. The cable 70 is provided at its other end with a plug 82 having two terminals 84 and 86. The terminals 84 and 86 are connected by the cable 70 to the contacts 78 and 80 of the socket 74 of the cable 70. Thus, the cable 70 is used to connect the crack detector 10 across a source of A.C. current.

The cable 72 includes two wires 88 and 90. A separate terminal clamp 92 is secured to one end of each of the wires 88 and 90. The other ends of the wires 88 and 90 are connected to the female contacts 76 and 78 of the socket 74 of the cable 72. Thus, the cable 72 is used to connect the crack detector 10 across a source of D.C. current, such as a battery.

In the use of the crack detector 10 of the present invention, the cable 60 of the crack detector 10 is either connected to a source of A.C. current by the connecting cable 70, or to a source of D.C. current by the connecting cable 72. The crack detector 10 can then be manually lifted by grasping the bight 14 of the handle 12, and placed with the free ends of the probes 22 engaging the surface of the cast metal piece being inspected. When the switch 40 is turned on, the inductance coil 28 or 30, according to whether D.C. current or A.C. current is being used, will create a magnetic path through the core rod 26, probes 22, and the article being inspected. By sprinkling iron filings over the surface of the metal member being inspected, any crack in the metal member will be outlined by the iron filings. Since the crack detector 10 of the present invention is relatively small and is compact, the crack detector 10 can be easily moved manually along the entire surface of the metal member being inspected. Also, the crack detector 10 of the present invention being compact and relatively small in size is relatively inexpensive to manufacture.

The present invention may be embodied in other specific forms without departing from the spirit or essential attributes thereof and, accordingly, reference should be made to the appended claims, rather than to the foregoing specification as indicating the scope of the invention.

We claim:
1. A magnetic crack detector comprising a hollow U-shaped handle, a separate magnetic metal probe extending longitudinally from the end of each leg of said handle, a rod of magnetic material extending between and supported by the legs of said handle and being in magnet circuit relation with each of said probes, two axially spaced inductance coils would around said rod, three terminal wires extending through and from said handle, one end of each of said inductance coils being electrically connected to a common one of said terminal wires in said handle, the other end of each of said inductance coils being electrically connected to a separate one of each of the other terminals within said handle, a voltage multiplying circuit connected across the ends of one of said inductance coils and across the terminal wires associated with said one coil, said one inductance coil terminal wires being adapted to be connected to a source of A.C. current, the other inductance coil terminal wires being adapted to be connected to a source of D.C. current, a switch electrically connected between the common terminal wire of said inductance coil and one end of each of said inductance coils, said switch being mounted within said handle and having an actuating button extending through said handle, said voltage multiplying circuit comprising an A.C. to D.C. current rectifying circuit, said voltage multiplying circuit being mounted within said handle.

2. A magnetic crack detector in accordance with claim 1 wherein said voltage multiplying circuit comprises a pair of capacitors connected in series with respect to each other and in parallel to one inductance coil, said A.C. to D.C. current rectifying circuit comprising a pair of rectifiers each connected in series between the separate terminal wire and a separate end of said one inductance coil, said rectifiers being polarized oppositely with respect to said separate terminal wire, and said switch being connected to said voltage multiplying circuit between said capacitors.

3. A magnetic crack detector in accordance with claim 2 wherein said capacitors are mounted in the bight of said handle, said rectifiers being mounted in one leg of said handle, said switch being mounted in one corner of said handle, the terminal wires extending from the other corner of said handle.

4. A magnetic crack detector in accordance with claim 3 wherein said terminal wires extend from said handle as a cable, and a three terminal plug connected to the end of said cable, each of said three terminal wires being connected to a separate one of said plug terminals.

References Cited in the file of this patent

UNITED STATES PATENTS

| | | |
|---|---|---|
| 1,960,898 | De Forest | May 29, 1934 |
| 2,362,194 | Dodd | Nov. 7, 1944 |
| 2,495,545 | Peterson et al. | Jan. 24, 1950 |
| 2,644,921 | Lewkowski | July 7, 1953 |

FOREIGN PATENTS

| | | |
|---|---|---|
| 510,094 | Great Britain | July 26, 1939 |
| 199,906 | Australia | Oct. 10, 1958 |